(12) United States Patent
Tsai et al.

(10) Patent No.: US 6,358,455 B1
(45) Date of Patent: Mar. 19, 2002

(54) PROCESS FOR PREPARING A LAMINATED COMPOSITE OF CONDENSATION TYPE SILICONE RUBBER AND POLYURETHANE BY INDUCE SURFACE RECONSTRUCTION

(75) Inventors: Ming-Fu Tsai, Lung-Tan; Yu-Der Lee, Hsinchu; Yong-Chien Ling, Lung-Tan; Wen-Hsiung Ku, Lung-Tan; Chang-Hao Tai, Lung-Tan, all of (TW)

(73) Assignee: Chung-Shan Institute of Science & Technology (TW)

( * ) Notice: Subject to any disclaimer, the term of this patent is extended or adjusted under 35 U.S.C. 154(b) by 0 days.

(21) Appl. No.: 09/450,359

(22) Filed: Nov. 29, 1999

(51) Int. Cl.$^7$ ............................ B29C 41/02; B29C 41/20
(52) U.S. Cl. .................. 264/250; 264/331.11; 264/337; 264/338
(58) Field of Search ........................... 264/250, 331.11, 264/337, 338

(56) References Cited

U.S. PATENT DOCUMENTS 4,098,856 A * 7/1978 Rosenau ................. 264/337 X

OTHER PUBLICATIONS

Ming–Fu Tsai, Yu–Der Lee, and Yong–Chien Ling; "Improved Adhesion of Silicone Rubber to Polyurethane By Induce Surface Reconsideration"; J. of Applied Polymer Science, vol. 70, No. 9, pp. 1669–1675; Nov. 28, 1998.

* cited by examiner

*Primary Examiner*—Leo B. Tentoni
(74) *Attorney, Agent, or Firm*—Jackson Walker L.L.P.

(57) ABSTRACT

Induced surface reconstruction of silicone rubber by blending silicone gel reactants with a modified and curing with a mold having high critical surface tension was used to improve the adhesion of chemically inert silicone rubber to polyurethane. The modifier has the following formula

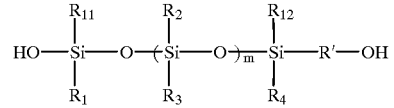

wherein m=25~50; $R_1$, $R_2$, $R_3$, $R_4$, $R_{11}$ and $R_{12}$ independently are alkyl; R' is R or OR, wherein R is a polymer backbone having a molecular weight of 1000~20000. The mold is formed with a material having a critical surface tension greater than that of a polymer having a repeating unit of said R.

20 Claims, 1 Drawing Sheet

PROCESS FOR PREPARING A LAMINATED COMPOSITE OF CONDENSATION TYPE SILICONE RUBBER AND POLYURETHANE BY INDUCE SURFACE RECONSTRUCTION

FIELD OF THE INVENTION

The present invention is related to a technique of bonding or adhering polyurethane to a condensation type silicone rubber, and in particular to a technique of surface modification of a condensation type silicone rubber to facilitate the bonding between the condensation type silicone rubber and polyurethane.

BACKGROUND OF THE INVENTION

The unusual heat, electrical weather, and low-temperature resistance properties of silicones, i.e., room temperature-vulcanizable (RTV) silicone rubber, have manifested themselves in a wide variety of applications. They are used as engineering materials for manufacturing electrical apparatus and machines. Strong adhesion of silicones to the target matrix is a requirement for long product life. The inherently hydrophobic nature of silicones, coupled with their ability to segregate to the surface, facilitates their use as a surface modifier for other materials. This property has been exploited in the preparation of silicone-modified polyesters; the synthesis of polydimethylsiloxane (PDMS) and polystyrene copolymers; polyimidesiloxane segmented copolymers triblock siloxane copolymers used as surface modifying additives; blood-compatible polyurethane (PU)-polysiloxane graft copolymers [Y. Ezuka, T. Ono, and K. Imai, J. *Colloid Interface Sci.*, 136, 408 (1990)]; and the surface treatment of fumed silica for use as antifoaming compounds. Small amounts of the copolymers (ca. 1~4 by weight) could be added to different polymers to alter their surface properties. The air-polymer surface of the resulting polymer system is usually dominated by the low surface-energy siloxane, preventing adhesion to polar materials. This phenomenon of surface segregation of a component with a low surface energy in multicomponent polymeric materials attracts attention to the analysis of polymer surfaces and the modifications of their properties [G. H. Fredrickson, *Macromolecules*, 20, 2535 (1987); T. P. Russell, G. Coulon, V. R. Deline, and D. C. Miller, *Macromolecules*, 22, 4600 (1989); K. R. Shull, *Macromolecules*, 25, 2122 (1992)].

Surface modification of polymers by chemical, photochemical, corona, plasma, and high-energy radiation treatments are currently used to increase the polarity of polymer surfaces, thus enhancing their adhesion to immiscible polymers [C. M. Chan, *Polymer Surface Modification and Characterization*, Hanser Publishers, Munich, 1993; W. H. Waddall, L. R. Evans, J. G. Gillick, and D. Shuttleworth, Rubber Chem. *Technol.*, 65, 687 (1992)]. An alternative means of modifying polymer surface is by blending with diblock copolymers, where one block interacts favorably with the base matrix and the other block with the target matrix [T. P. Russell, V. R. Deline, V. S. Wakharkar, and G. Coulon, *MRS Bull.*, October, 33 (1989)]. The polymeric surface can form ordered, oriented layers at the surface during subsequent curing. The part of such copolymers with a low critical surface tension is readily miscible with the silicone base matrix, whereas the other part interacts favorably with the more polar matrix. Both blocks can anchor the copolymer into the respective substrate, which ensures permanency of the surface modification and increases adhesion between two immiscible polymers.

A condensation type silicone rubber contains residual SiOH functional groups on its surface after being cured; however, the residual SiOH functional groups do not form reliable chemical linkages with —NCO groups of a polyurethane when them are brought into contact with each other. Further, the low surface energy of the cured silicone rubber causes the polyurethane have insufficient wetability to adhere to the surface thereof.

A primary objective of the present invention is to provide a process for preparing a laminated composite of a condensation type silicone rubber and polyurethane.

Another objective of the present invention is to provide a process for preparing a condensation type silicone rubber having an increased surface energy by induce surface reconstruction.

Still another objective of the present invention is to provide a modifier for increasing a surface energy of a condensation type silicone rubber.

SUMMARY OF THE INVENTION

In order to accomplish the objectives of the present invention, a process for preparing a laminated composite of a condensation type silicone rubber and a polyurethane carried out In accordance with the present invention comprises the following the steps:

(a) mixing a modifier, a silicone gel of condensation type and a curing agent for said silicone gel to form a mixture, said modifier having the following formula (I):

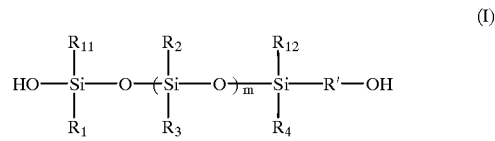

wherein m=25~50; $R_1$, $R_2$, $R_3$, $R_4$, $R_{11}$ and $R_{12}$ independently are —$CH_3$ or —$CH_2CH_3$; R' is R or OR, wherein R is a polymer backbone having a molecular weight of 1000~20000;

(b) introducing said mixture from step (a) into a cavity of a mold, in which a surface of the cavity is formed by a material having a critical surface tension greater than that of a polymer having a repeating unit of said R;

(c) curing said mixture in said cavity to form a shaped article;

(d) removing said shaped article from said mold;

(e) placing a polyurethane precursor on a surface of said shaped article which contacts said surface of said cavity; and (f) curing said polyurethane precursor to form an cured polyurethane bonding to said surface of said shaped article, so that a laminated composite is formed.

Preferably, the process of the present invention further comprises (d') removing volatile alcohol from said shaped article formed during said curing in step (c) by evaporation prior to step (e).

In step (e), a suitable polyurethane precursor is a liquid mixture comprising a polyol, and a polyisocyanate, and optional a catalyst, wherein OH group:NCO group=0.7:1 to 0.9:1 (molar), preferably 0.8:1.

Alternatively, the polyurethane precursor is a polyurethane elastomer having a tensile strength of 20~40 kg/$cm^2$ and an elongation ratio at break of 200~400%.

The curing in step (f) of the process of the present invention is preferably carried out at a temperature of 60° C. to 80° C. for a period longer than 120 hours.

The present invention also discloses a process for preparing a condensation type silicone rubber having an enhanced critical surface tension, which comprises steps (a) to (c) defined as above.

Preferably, R in the formula (I) is

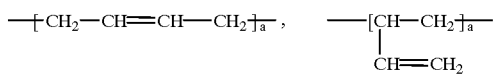

or a combination of each other, wherein a is an integer of 30~100, preferably a is an integer of 40~60.

A suitable curing agent for said silicone gel in step (a) of the process of the present invention Includes (but not limited thereto) compounds having a formula of $(R_{20})_n Si(OR_{21})_{4-n}$, wherein n is an integer of 0, 1 or 2; $R_{20}$ is —$CH_3$ or —$CH_2CH_3$; and $R_{21}$ is —$CH_3$, —$CH_2CH_3$, or —$CH_2CH_2CH_3$.

Preferably, said silicone gel of condensation type used in step (a) is a silicone having the following formula (II):

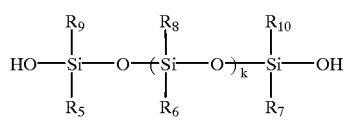

(II)

wherein k is a value so that the silicone (II) has a molecular weight of 1000~10000; and $R_5$, $R_6$, $R_7$, $R_8$, $R_9$ and $R_{10}$ independently are —$CH_3$ or —$CH_2CH_3$.

A suitable amount of said modifier used in step (a) ranges from 0.5 to 10.0 phr (per hundred parts by weight of said silicone gel of condensation type), and preferably from 1.0 to 3.0 phr.

Preferably, said curing in step (c) is carried out at a temperature from room temperature to 50° C. for a period of 12 to 24 hours.

DETAILED DESCRIPTION OF THE PREFERRED EMBODIMENTS OF THE INVENTION

Figure 1:
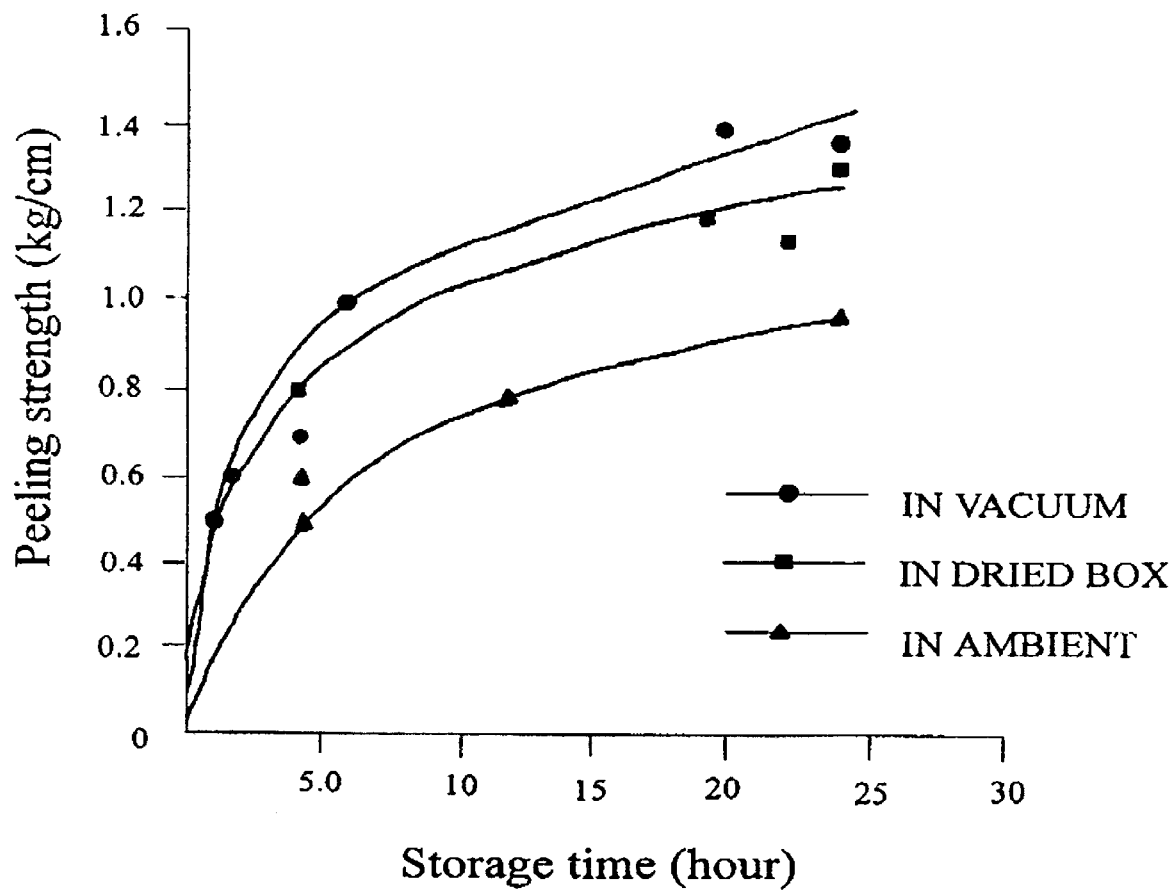
FIG. 1 is a peeling strength vs. storage time plot showing the storage time and condition dependence of the peeling strength between Al-treated silicone rubber and polyurethane at 25° C. of a laminated composite prepared according to the present invention, wherein the black round dots, the black square dots and the black triangular dots represent the results obtained in vacuum, in dried box and in ambient, respectively.

In this invention we describe a specific bond between silicone rubber of condensation type and polyurethane (PU) using an induced surface reconstruction approach. This was realized by blending small amounts of PDMS-hydroxyl terminated polybutadiene (HTPB) copoylners with PDMS, then casting them on appropriate molding plates during curing to induce the formation of desired surface property. The abbreviation of PDMS represents bifunctional polydimethylsiloxane. The PDMS-b-HTPB copolymers at the surface of the silicone rubber can serve as a bridge between the silicone rubber and PU. The PDMS at one end mixes well with the PDMS base matrix, whereas the HTPS segregating to the surface participates in the crosslinking reaction of the PU target matrix. The surface composition of the induced silicone rubber was investigated using Fourier transfer infrared-attenuated total reflectance (FTIR-ATR). Peel strength was used to measure adhesion of silicone rubber to PU. The correlation between surface composition and peel strength suggests a cause for improved adhesion of silicone rubber to Pu.

Experimental

Materials

Dichorodimethylsilane (DCDMS) was obtained from Petrach System (Bristol, Pa.). HTPB was obtained from Arco having a code name of R45-M. Hydroxyl-terminated PDMS was obtained from Dow Corning (Midland, Mich.) having a code name of $Q_1$-3563. HTPB and PDMS were dried in a rotary flask under vacuum at 70° C. for 4 h before use. The number-average molar mass ($\overline{Mn}$) and OH values are 2,300 and 0.82 for HTPB, 3,400 and 1.0 for PDMS, respectively. Toluene was dried over sodium at 80° C. overnight, followed by distillation using benzophenone as an indicator. Other reagents were purified by the usual methods. The silicones used were commercially available RTV silicones, RTV-700, from General Electric (Waterford, N.Y.).

The molds used were Al, Fe, low-density polyethylene (PE, density=0.95 g/cm³), and Teflon (Du Pont TFE-Teflon, Wellington, Del.). The surfaces of the Al and Fe were sanded and degreased with chloroform prior to use. All other molds were used as received.

RTV-700 silicone contains a main part and a hardener part. The main part contains a silanol-terminated polydimethylsiloxane having a viscosity of about 20000~30000 cps, 20–30 wt % $SiO_2$ filler, and silicone oil for adjusting viscosity. The hardener part were analyzed and found that it contains 25% propanol, 28% $Fe_2O_3$ as a filler and 47% active silane ($Si(OCH_3)_4$) as a curing agent.

Synthesis of PDMS-b-HTPB Copolymers

The PDMS-b-HTPB copolymers were synthesized according to the method presented in Scheme 1. A total of 25.2 g of PDMS and an excess amount of DCDMS (3.2 g; molar ratio PDMS:DCDMS=1 3.4) were dissolved in 76 g of toluene. Several drops of pyridine were added. The reaction was continued with stirring for 4 h at 80° C. A viscous fluid of chlorine terminated PDMS (CTPDMS) was obtained after the residual solvent and DCOMS were removed from the reaction flask by distillation. A total of 80 g of toluene and 17.6 g of HTPB (molar ratio CTPDMS:HTPB=1:1) were carefully added into the reaction flask, followed by the addition of several drops of pyridine. The reaction mixture was stirred in a thermostatted bath at 100° C. for 4 h and terminated by the addition of water. The product (PDMS-b-HTPB copolymers) was isolated and purified by repeatedly washing with deionized distilled water.

Scheme 1

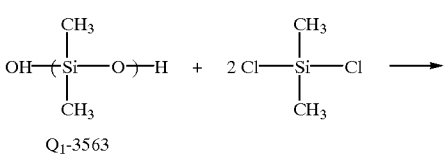

$Q_1$-3563

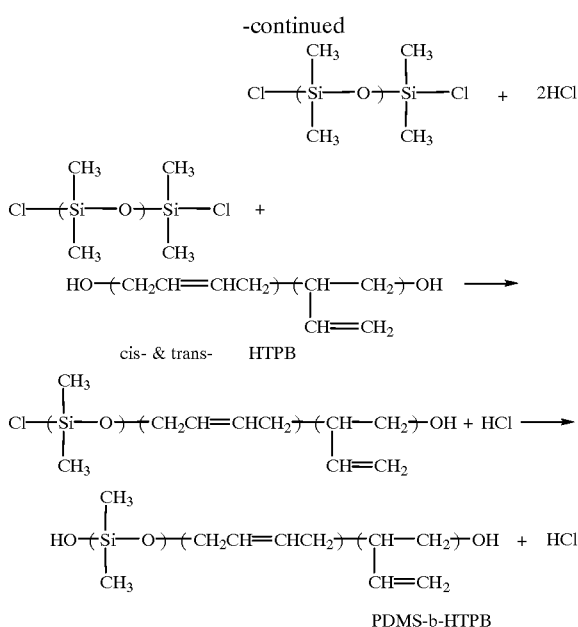

cis- & trans- HTPB

PDMS-b-HTPB

Induced Surface Reconstruction of Silicone Rubber

The RTV-700 was homogeneously mixed with $Si(OC_3H_7)_4$ curing agent (molar ratio RTV-700:$(OC_3H_7)_4$= 10:1), about 1 wt % PDMS-b-HTPB copolymers, and dibutyl-tin dilaurate catalyst in a beaker by stirring at ambient conditions. The samples were cured at room temperature for 24 h between smooth-surface molds in a hydraulically operated press at atmospheric pressure to induce surface reconstruction of the silicone rubber. The rubber was removed from the mold and placed under vacuum for 24 h to remove the propanol by-products.

Adhesion of Native and Surface Reconstructed Silicone Rubbers to PU

The PU target matrix was prepared by mixing HTPB, toluylene-2,4-dilsocyanate (TDI), and antimony (III) oxide ($Sb_2O_3$) in the weight ratio of 100:7.08:180. The mixtures were poured on top of the silicone rubbers (native and surface-reconstructed). The curing reaction of PU was continued for 5 days at 70° C. under a hydraulically operated press at atmospheric pressure, unless otherwise specified.

Measurements and Instruments

The size (expressed as radius of gyration which is the root mean square distance of the elements of the polymer chain from its center of gravity), $\overline{M}n$, silanol content, and alcohol contents of the PDMS-b-HTPB copolymers and the corresponding reactants (CTPDMS and HTPB) were characterized using gel permeation chromatography (GPC) (in toluene versus polystyrene standards), vapor pressure osmometry (VPO), and Karl Fischer titration. The GPC was measured using a Waters ALC/GPC-150C equipped with a column equally packed with $10^5$, $10^4$, $10^3$, and 500 Å $\mu$-Sytragel operated at 30° C. and 1 mL/min flow rate. The size of the polymer was determined by comparing Its retention time with that of polystyrene standards with known size. $\overline{M}n$ by VPO was determined in toluene using a Knauer instrument and calibrated with standard PPG 2000 samples. Karl Fischer titration was carried out Using a Metrohm K. F. Processor model 658. The surface composition of the silicone rubber was obtained by analyzing the FTIR-ATR spectra. The spectra were recorded with a Nicolet 5DX FTIR and scanned between 800 and 4,000 $cm^{-1}$ at a resolution of 4 $cm^{-1}$. A Ge prism with a 45-degree face cut was used as the internal reflectance element. A total of 200 scans were obtained to yield the average spectrum. The bonding strength between the silicone rubber and PU was obtained according to the ASTM-D903-49 peel test method with an Instron. Static contact angles of water droplet were measured at 25° C. at by an NRL-Moel-A-100 contact angle geniometer.

Results and Discussion

Synthesis and Characterization of PDMS-b-HTPB Copolymers

The PDMS-b-HTPB copolymers were synthesized as shown in Scheme 1. The backbone component of CTPDMS was prepared by reaction of PDMS having a silanol end group ($Q_1$-3563)with DCDMS, followed by chain extension with HTPB to form the PDMS-b-HTPB copolymer. The $\overline{M}n$ of the PDMS-b-HTPB copolymers was controlled by terminating the chain extension of intermediate products via hydrolysis.

The size and $\overline{M}n$, of the PDMS-b-HTPB copolymers product, and the DCPDMS and HTPB reactants obtained by GPC and VPO, respectively, are shown in Table 1 along with the Si—OH and R—OH content (wt %). The molar mass and size, as well as the reduction In R—OH content, indicate hat the PDMS-b-HTPB copolymer is predominantly a diblock copolymer.

TABLE 1

| Polymer | Size (Å) | $\overline{M}n$ (g $mol^{-1}$) | Si—OH (wt %) | R—OH (wt %) |
|---|---|---|---|---|
| CTPDMS | 263 | 3,400 | — | — |
| HTPB | 157 | 2,800 | — | — |
| PDMS-b-HTPB copolymers | 410 | 6,800 | 0.28 | 0.22 |

Adhesion of Native and Surface Reconstructed Silicone Rubbers to PU

Trace amounts of PDMS-b-HTPB copolymers and $Si(OC_3H_7)_4$ curing agents were mixed with RTV-700, followed by condensation curing using dibutyl-tin dilaurate catalyst (Scheme 2) under appropriate conditions to prepare native and surface-reconstructed silicone rubbers. The propanol by-product was expected to react more rapidly with the TDI than the HTPB due to the mobility of propanol. The silicone rubbers were therefore stored under various conditions before subsequent PU curing reactions to investigate the effect of propanol on the peel strength between silicone rubber and PU.

Scheme 2

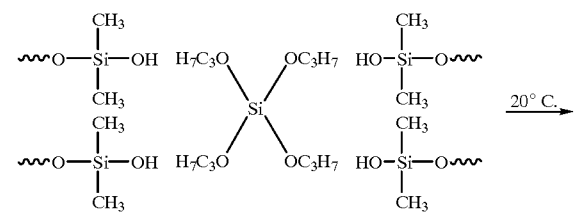

-continued

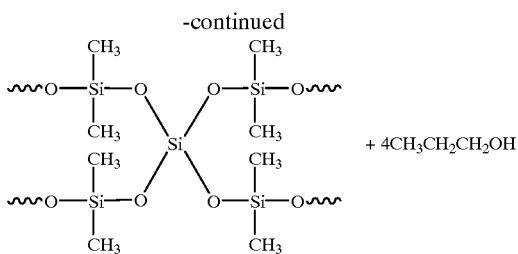

+ 4CH₃CH₂CH₂OH

FIG. 1 shows the peel strength between silicone rubber and PU as a function of the storage time of the surface-reconstructed silicone rubber at 25° C. in ambient, dried box, and vacuum (about 10 torr) conditions. The mold used was Al. The PU adhered to the silicone rubber after the specified storage time. The peel test was performed after the PU was cured for 5 days at 70° C. Vacuum storage conditions always yielded a higher peel strength for the silicone rubber/PU layers. The peel strength was observed to increase with increasing storage time, regardless of the storage condition, with the maximum value obtained after 24 h of storage time. The dependence of peel strength on storage time and condition could, presumably, be attributed to the propanol by-products from the condensation-curing reaction. The amounts of propanol residues in the silicon rubber were found to decrease in the order of ambient, dried box, and vacuum storage condition and with increasing storage time. This was consistent with the expectation that the amount of volatile propanol that escaped from the silicone rubber would increase under reduced pressure and with increased exposure time. The final amount of propanol residue found in the silicone rubber was monitored at 4-h storage intervals, up to 48 h, in vacuum. A nearly constant value of about 2% was obtained after 24 h. Therefore, it can be concluded that the peel strength between the silicone rubber and the PU was strongly dependent on the amount of propanol residue from the RTV-700 condensation-curing reaction. All silicone rubbers studied thereafter were, therefore, stored in vacuum at 25° C. before subsequent processing.

The effects of mold materials on the peel strength between silicone rubber and PU were investigated. The maximum peel strength between silicone rubber and PU and the critical surface tension ($\gamma_c$) of these mold materials are listed in Table 2. The $\gamma_c$ values are related to the surface composition. In principle, a small change in the polarity, or hydrophilicity, of the surface results in a clear change of its $\gamma_c$. The $Y_c$ values therefore reflect the hydrophilic nature of the mold materials. It is clear that the higher the $\gamma_c$ of the mold material, the higher the peel strength between the surface-reconstructed silicone rubber and PU. This indicates that the hydrophilic nature of PE, Al, and Fe have caused a segregation of the high surface-energy HTPB blocks to the surface, as opposed to the lower surface-energy PDMS blocks. The HTPB blocks that have segregated to the surface of the silicone rubber may subsequently participate in the end-linking reaction of HTPB/TDI/Sb₂O₃ mixture to form the PU. The increased peel strength may therefore be attributed to the surface enrichment of HTPB blocks. The decrease in peel strength with increased storage time for Al-treated silicone rubber indicates that the system is in dynamic equilibrium. The PDMS blocks have a propensity to segregate to and accumulate at the silicone rubber-PU interface. This weakens the interfacial bonding. The segregation of PDMS blocks to the surface could be accelerated by heat. Thus when the Al-treated silicone rubber was heated at 70° C. for 1 h followed by adhesion to PU, at room temperature the peel strength become zero due to the decrease in the adhesion of silicone rubber to PU. However, the original peel strength of about 1.2 kg/cm could be recovered when the heated Al-treated silicone rubber was cooled to room temperature (with the Al mold on) prior to adhesion to PU. These observations indicate that the adhesion of silicone rubber to PU Is influenced by the presence of HTPB blocks extruding out of the silicone rubber which, in turn, depends on the temperature of the system prior to adhesion to PU. The increased concentration of surface HTPB accounted for the improved adhesion of silicone rubber to PU.

TABLE 2

| Mold material | Critical surface tension at 20° C. (dyn/cm) | Peel strength (kg/cm) |
| --- | --- | --- |
| Air | — | 0.1 |
| Teflon | 18.5 | 0.2 |
| Polyethylene | 31.0 | 1.1 |
| Al | 40 | 1.2 |
| Fe | 40 | 1.3 |

Surface Characterization of Silicone Rubber by FTIR-ATR

Te FTIR-ATR spectra of silicone rubber containing no PDMS-b-HTPB copolymers, Al-treated silicone rubber containing PDMS-b-HTPB copolymers, and Teflon-treated silicone rubber containing PDMS-b-HTPB copolymers. The depth of penetration in the region of C-H stretching at 3,000 cm⁻¹ is 0.1 μm for the Ge element. The intensity of the $CH_2$ symmetric stretching at 2,850 cm⁻¹ was therefore used to represent the HTPB surface concentration. The ratio of HTPB at the surface in Al-treated and Teflon-treated silicone rubber was determined using the ratio of peak intensities at 2,850 cm⁻¹, after subtracting the spectrum of silicone rubber containing no PDMS-b-HTPB copolymers. The background-corrected peak intensities (in absorbance units) at 2,850 cm⁻¹ of Al-treated and Teflon-treated silicone rubber spectra were 0.043 and 0.032, respectively. A simple calculation indicates that the surface concentration of HTPB in Al-treated silicone rubber is 34% greater than that in Teflon-treated silicone rubber. This suggests that the improved adhesion of silicone rubber to PU could be attributed to an induced surface enrichment of HTPB blocks.

Improved Adhesion of Silicone Rubber to PU

The FTIR-ATR and $\gamma_c$ measurements of the silicone rubber surfaces revealed very different characteristics from those expected from the bulk structure. A "island-hole" type microphase-separated surface structure for the silicone rubber containing PDMS-b-HTPB copolymers was envisaged. There are several competing tendencies that determine the composition in the surface region. One is the reduction of the surface energy of the contact media surface of the silicone rubber. If RTV-700 is cured in contact with air, the PDMS domains spread over the surface due to the lower surface energy of PDMS (24 dyn/cm). In contact with Al (40 dyn/cm) during curing, the surface responds to the change of contacting media by rearranging its structure. The hydrophilic blocks (i.e., HTPB) could overcome the energy barrier and segregate to the surface for a minimized overall free energy. The surface becomes HTPB-enriched. The measured static contact angles using deionized water are 114 degrees, 101 to 103 degrees, and 112 to 114 degrees for the native, Al-treated, and Teflon-treated silicone rubber containing PDMS-b-HTPB copolymers, respectively, which agrees with this suggestion. In addition, the crosslinking density of the base matrix (i.e., the silicone rubber which might determine the ease of segregation) as well as the extent of reaction with the target matrix (i.e., the PU which might determine the stability of anchoring) might also effect the preservation of HTPB blocks on the surface. Considering these factors, improved adhesion of silicone rubber to PU could be attributed to the enrichment of HTPB blocks on the silicone rubber surface.

What is claimed is:

1. A process for preparing a laminated composite of a condensation type silicone rubber and a polyurethane comprising the following steps:

(a) mixing a modifier, a silicone gel of condensation type and a curing agent for said silicone gel to form a mixture, said modifier having the following formula (I):

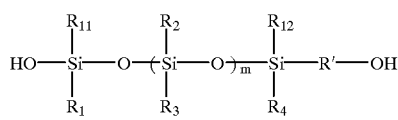

(I)

wherein m=25~50; $R_1$, $R_2$, $R_3$, $R_4$, $R_{11}$ and $R_{12}$ independently are —$CH_3$ or —$CH_2CH_3$; R' is R or OR, wherein R is a polymer backbone having a molecular weight of 1000~20000;

(b) introducing said mixture from step (a) into a cavity of a mold, in which a surface of the cavity is formed by a material having a critical surface tension greater than that of a polymer having a repeating unit of said R;

(c) curing said mixture in said cavity to form a shaped article;

(d) removing said shaped article from said mold;

(e) placing a polyurethane precursor on a surface of said shaped article which contacts said surface of said cavity; and (f) curing said polyurethane precursor to form an cured polyurethane bonding to said surface of said shaped article, so that a laminated composite is formed.

2. The process according to claim 1 further comprising (d') removing volatile alcohol from said shaped article formed during said curing in step (c) by evaporation prior to step (e).

3. The process according to claim 1, wherein said polyurethane precursor in step (e) is a liquid mixture comprising a polyol, and a polyisocyanate, and optional a catalyst, wherein the molar ratio of OH group:NCO group=0.7:1 to 0.9:1.

4. The process according to claim 1, wherein said polyurethane precursor in step (e) is a polyurethane elastomer having a tensile strength of 20~40 kg/cm² and an elongation ratio at break of 200~400%.

5. The process according to claim 1, wherein the curing in step (f) is carried out at a temperature of 60° C. to 80° C. for a period longer than 120 hours.

6. The process according to claim 1, wherein R in the formula (I) is

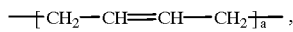, 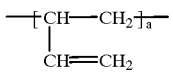

or a combination of each other, wherein a is an integer of 30~100.

7. The process according to claim 6, wherein a is an integer of 40~60.

8. The process according to claim 1, wherein said curing agent for said silicone gel in step (a) has a formula of $(R_{20})_nSi(OR_{21})_{4-n}$, wherein n is an integer of 0, 1 or 2; $R_{20}$ is —$CH_3$ or —$CH_2CH_3$; and $R_{21}$ is —$CH_3$, —$CH_2CH_3$, or —$CH_2CH_2CH_3$.

9. The process according to claim 1, wherein said silicone gel of condensation type used in step (a) is a silicone having the following formula (II):

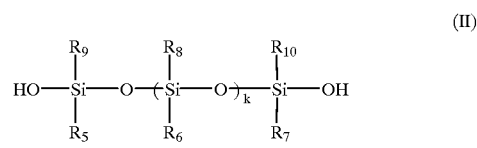

(II)

wherein k is a value so that the silicone (II) has a molecular weight of 1000~10000; and $R_5$, $R_6$, $R_7$, $R_8$, $R_9$ and $R_{10}$ independently are —$CH_3$ or —$CH_2CH_3$.

10. The process according to claim 1, wherein 0.5 to 10.0 parts by weight of said modifier was mixed in step (a) per hundred parts by weight of said silicone gel of condensation type.

11. The process according to claim 1, wherein 1.0 to 3.0 parts by weight of said modifier was mixed in step (a) per hundred parts by weight of said silicone gel of condensation type.

12. The process according to claim 1, wherein said curing in step (c) is carried out at a temperature from room temperature to 50° C. for a period of 12 to 24 hours.

13. A process for preparing a condensation type silicone rubber having an enhanced critical surface tension, which comprises the following steps:

(a) mixing a modifier, a silicone gel of condensation type and a curing agent for said silicone gel to form a mixture, said modifier having the following formula (I):

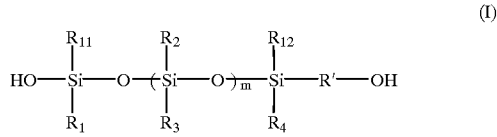

(I)

wherein m=25~50; $R_1$, $R_2$, $R_3$, $R_4$, $R_{11}$ and $R_{12}$ independently are —$CH_3$ or —$CH_2CH_3$; R' is R or OR, wherein R is a polymer backbone having a molecular weight of 1000~20000;

(b) introducing said mixture from step (a) into a cavity of a mold, in which a surface of the cavity is formed by a material having a critical surface tension greater than that of a polymer having a repeating unit of said R;

(c) curing said mixture in said cavity to form a shaped article.

14. The process according to claim 1, wherein R in the formula (I) is

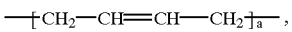, 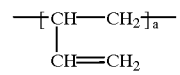

or a combination of each other, wherein a is an integer of 30~100.

15. The process according to claim 14, wherein, a is an integer of 40~60.

16. The process according to claim 13, wherein said curing agent for said silicone gel in step (a) has a formula of $(R_{20})_n Si(OR_{21})_{4-n}$, wherein n is an integer of 0, 1 or 2; $R_{20}$ is $-CH_3$ or $-CH_2CH_3$; and $R_{21}$ is $-CH_3$, $-CH_2CH_3$, or $-CH_2CH_2CH_3$.

17. The process according to claim 13, wherein said silicone gel of condensation type used in step (a) is a silicone having the following formula (II):

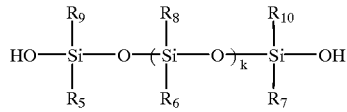
(II)

wherein k is a value so that the silicone (II) has a molecular weight of 1000~10000; and $R_5$, $R_6$, $R_7$, $R_8$, $R_9$ and $R_{10}$ independently are $-OH_3$ or $-CH_2CH_3$.

18. The process according to claim 13, wherein 0.5 to 10.0 parts by weight of said modifier was mixed in step (a) per hundred parts by weight of said silicone gel of condensation type.

19. The process according to claim 18, wherein 1.0 to 3.0 parts by weight of said modifier was mixed in step (a) per hundred parts by weight of said silicone gel of condensation type.

20. The process according to claim 13, wherein said curing in step (c) is carried out at a temperature from room temperature to 50° C. for a period of 12 to 24 hours.

* * * * *